United States Patent
Isley

[15] 3,656,027
[45] Apr. 11, 1972

[54] ELECTRICAL CAPACITOR HAVING ELECTRICALLY-CONDUCTIVE, IMPERVIOUS CONNECTOR

[72] Inventor: Ralph E. Isley, Northfield, Ohio
[73] Assignee: The Standard Oil Company, Cleveland, Ohio
[22] Filed: Dec. 28, 1970
[21] Appl. No.: 101,912

[52] U.S. Cl. .................................................317/230, 136/6
[51] Int. Cl. ...................................................H01g 9/00
[58] Field of Search ..............317/230, 231, 232, 233; 136/6

[56] References Cited

UNITED STATES PATENTS

| | | |
|---|---|---|
| 2,800,616 | 7/1957 | Becker...................................317/230 |
| 3,105,178 | 9/1963 | Meyers..............................317/230 X |
| 3,288,641 | 11/1966 | Rightmire..................................136/6 |
| 3,536,963 | 10/1970 | Boos.....................................317/230 |

*Primary Examiner*—James D. Kallam
*Attorney*—John F. Jones and Sherman J. Kemmer

[57] ABSTRACT

An inter-cell, electron-conducting, ion-insulating connector for use in an electrical capacitor comprising a substrate of metal sheet or graphite which is laminated on at least one side with an elastomer containing electrically conductive carbon black in sufficient amounts to render the elastomer conducting.

10 Claims, 2 Drawing Figures

Patented April 11, 1972 3,656,027

INVENTOR.
RALPH E. ISLEY
BY
*John F. Jones*
ATTORNEY

ELECTRICAL CAPACITOR HAVING ELECTRICALLY-CONDUCTIVE, IMPERVIOUS CONNECTOR

This invention relates to an improved electrical capacitor and more particularly to an electrically conductive, impervious connector for use in an electrical capacitor having excellent stability at elevated temperatures.

The connector of this invention is characterized as an electron-conducting and an intercell ionic-insulating member that is chemically inert to the corrosive electrolyte of the cell at elevated temperatures.

One of the most difficult problems to solve in achieving a paste electrode capacitor with temperature stability is finding a connector that is chemically inert to the corrosive electrolyte at elevated temperatures and at the same time contributes little to the overall equivalent series resistance of the system. Most metals that have low corrosion rates in electrolytes do so by forming a protective film on the surface of the metal. This film then insulates the electrode from the metal connector thereby resulting in a cell with high equivalent series resistance. An obvious means for overcoming this problem of protective film formation on the surface of the metal is to plate the metal or metal alloy substrate with a layer of an inert noble metal such as gold. However, in most cases this method is impractical from the standpoint of cost.

The electrically conductive connector of this invention which meets the requirements for a capacitor operable in the range of −40° to 175° C. comprises a substrate of metal sheet, metal foil or graphite sheet having laminated thereto on at least one side an electrically conductive polymer. Preferably the polymer is one that can be blended with a sufficient amount of electrically conductive carbon black to give the desired level of conductivity. Because high concentrations of carbon black are required for this purpose, elastomers are generally more satisfactory than high modulus resins. The preferred elastomers are those in which sufficient amounts of carbon black can be added to increase the conductivity or conversely to lower the resistance of the elastomer to within the range of $10^{-4}$ ohm -in$^2$/mil, or so that the equivalent series resistance of the overall cell does not exceed 30 milliohms.

The elastomers suitable for lamination for the connector of this invention are the natural rubbers and the synthetic rubbers obtained from ethylene, propylene, isobutylene, butadiene, isoprene, chloroprene, copolymers of styrene-butadiene, copolymers of isobutylene with various conjugated dienes wherein the amount of the diene does not exceed about 5 percent, as for example the butyl rubbers, chlorosulfonated polyethylene, vinylidene fluoride polymers, ethylene-propylene terpolymers, nitrile rubbers, and Thiokol rubbers. Preferred are the natural rubbers and the synthetic rubbers prepared from copolymers of butadiene with styrene or acrylonitrile, and most preferred are the butyl rubbers because of their ability to retain large amounts of conductive carbon black and at the same time maintain their other desirable properties.

The carbon blacks suitable for the purpose of this invention are preferably finely divided, electrically conductive furnace blacks that are produced by the thermal decomposition or incomplete combustion of petroleum oil or natural gas. Channel blacks or blacks made fine by grinding, although operable in this invention, are less satisfactory for this purpose. The carbon blacks are advantageously added to the rubber on a weight basis in concentrations ranging from 50 to 200 parts of carbon black per hundred parts of the rubber and preferably from 75 to 175 parts of the carbon black per hundred parts of rubber.

The substrate of the connector may consist of any one of a number of metals or metal alloys in the form of a sheet or foil. The preferred metals are those that contribute a minimum of resistance to the equivalent series resistance of the cell. Examples of suitable metals include copper, and copper alloys such as brass, steel, niobium, tin, tin plate on steel, molybdenum, tantalum and zirconium. Especially preferred are nickel and nickel-containing alloys such as the Hastelloy alloys which are alloys consisting essentially of nickel, iron, and molybdenum; the Monel metals which are alloys of predominantly nickel and copper; etc. Nickel and nickel alloys are preferred because of the low interfacial resistances produced between the elastomer laminate and the nickel substrate. Not to be excluded from substrate materials of this invention is graphite sheet, also found to be satisfactory for this purpose.

In another aspect of this invention the substrate may comprise a loose net of non-conducting woven fibers instead of metal. In such an embodiment the elastomer is superposed on a mat or a loose net of fibers composed of such materials as glass, asbestos, carbon, cellulose, etc., for the purpose of preventing the elastomer from stretching. Metallic screen is also suitable as a substrate material.

The rubber-carbon black blends may be applied to the substrate by any one of several methods known to those skilled in the art. For example, they may be applied by calendering, silk screening, spray coating, brush coating, etc. For most applications the carbon saturated elastomer is mixed with a suitable hydrocarbon or substituted hydrocarbon solvent to obtain the desirable consistency for the particular method of application employed. Solvent systems particularly satisfactory for the carbon-saturated butyl rubbers are toluene and mixtures of toluene and the xylenes.

The elastomer coating should be applied to the substrate in sufficient thickness to provide for adequate corrosion protection against the electrolyte and at the same time not too thick a coating should be applied so as to increase the overall electrical resistance of the cell beyond the desirable limits. Generally, a thickness of at least 2 mils is found to be essential to provide the corrosion protection required, and the coating should not exceed a thickness of about 10 mils so as not to increase the resistance of the overall system beyond the 30 milliohm limit.

The laminate of the carbon-saturated elastomer may be applied directly on the metal substrate or it may be desirable to improve its adhesiveness by previously coating the substrate with a metal primer. Again the primer selected should be one that is electrically conductive and one that contributes little electrical resistance to the system at the temperature of operation of the cell. Examples of suitable primers include phenylethylethanol amine, trimethoxysilylpropethylene diamine, tetraethyl ammonium toluene parasulfonate, gamma aminopropyltriethoxysilane, and in particular, polyethyleneimine.

It is advantageous to seal the elastomer laminate to the metal substrate by compression molding to improve corrosion protection and to lower the electrical resistance of the coating. To further reduce the electrical resistance of the laminate on the metal substrate the elastomer coating may be cured by exposure to nuclear radiation, ultraviolet light, infrared radiation, steam, hot air and preferably vulcanization under pressure. In the vulcanizing procedure, the carbon-saturated elastomer is mixed with the usual vulcanizing agents such as accelerators, antioxidants, antiozonants, waxes, stabilizers etc. and is cured at temperatures of from room temperature to 360° F. and at pressures of from 15 to 25,000 psi, for a period of time ranging from 5 minutes to 24 hours, depending on the temperature of cure. For example, a laminate may be cured at room temperature for a period of 24 hours.

The invention will be more readily understood from the following detailed description taken in conjunction with the drawings wherein.

Figure 1:
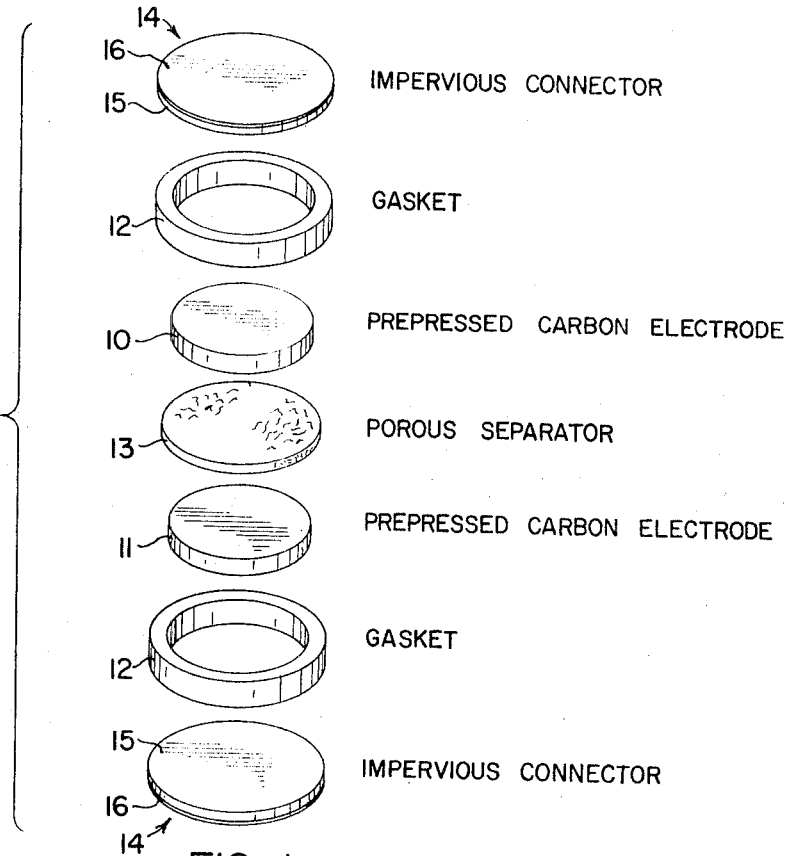
FIG. 1 is an exploded view showing the parts of the capacitor.

FIG. 1 represents one example of a single cell electrical capacitor consisting of a pair of carbon paste electrodes 10, 11, a porous separator 13, a pair of electron-conducting and ionic-insulating members 14 comprising in combination a metal substrate 16 and laminated on at least one side with a protective coating of an elastomer 15 having a high loading of conductive carbon black particles. Member 14 is characterized by its electrical-conducting properties and its chemical inertness to the particular electrolyte employed at the potential impressed upon it. Its primary functions are as a current collector and an inter-cell ionic insulator.

An annular means or a gasket 12 is preferably cemented or in some manner affixed to conducting member 14. Since paste electrodes 10 and 11 are not rigid masses but are to some extent flexible, the principal function of gasket 12 is to confine the electrodes 10 and 11 and prevent the mass of the electrode material from seeping out. The gasket is preferably constructed from an insulating material although it need not necessarily be limited to this type of material. The gasket material should be flexible to accommodate expansion and contraction of the electrode. Other obvious ways of confining the electrode should be apparent to those skilled in the art.

Separator 13 is generally made of a highly porous material which functions as an electronic insulator between the electrodes yet allows free and unobstructed movement to the ions in the electrolyte. The pores of the separator 13 must be small enough to prevent contact between the opposing electrodes, since such a condition would result in a short circuit and consequent rapid depletion of the charges accumulated on the electrodes. The separator can also be a non-porous ion-conducting film, such as an ion-exchange membrane. Any conventional battery separator should be suitable, and materials such as porous polyvinyl chloride, glass fiber filter paper, (Watman G.F.A.), cellulose acetate, mixed esters of cellulose, and fiber glass cloth have been found to be useful. Prior to its use it is advantageous to saturate the separator with electrolyte. This can be accomplished by soaking the separator in the electrolyte for a period of time of up to about 15 minutes.

The carbon electrodes 10 and 11 consist of activated carbon particles in admixture with the electrolyte. Activation of carbon is the process by which adsorption properties and surface area are imparted to a naturally occurring carbonaceous material. Because electrical energy storage of a capacitor is apparently based on surface area, an increase in energy storage can be expected from an increase in surface area, as by activation.

Active carbon, which is utilized in the preparation of the carbon paste electrodes, has surface area in the range of 100–2,000 meters$^2$/g, and preferably in the range of 500–1,500 meters$^2$/g as measured by the Brunauer-Emmett-Teller method. The surface area is mainly internal and may be generated by numerous activation methods.

The initial stage in the preparation of an active carbon is carbonization or charring of the raw material, usually conducted in the absence of air below 600° C. Just about any carbon-containing substance can be charred. After the source material is charred, the second step is activation. The method used most extensively to increase the activity of carbonized material is controlled oxidation of a charge by suitable oxidizing gases at elevated temperatures. Most of the present commercial processes involve steam or carbon dioxide activation between 800° C and 1,000° C, or air oxidation between 300° C. and 600° C. Alternately, gases such as chlorine, sulfur dioxide and phosphorous may also be used. Other activation methods include activation with metallic chlorides and electrochemical activation.

Paste electrode 11 may also comprise a paste formed from the electrolyte in admixture with solid particles of boron carbide or a refractory hard metal carbide or boride wherein the metal may comprise tantalum, niobium, zirconium, tungsten and titanium, as more fully disclosed in copending application Ser. No. 71,852, filed Sept. 14, 1970. Also, paste electrode 11 may comprise a mixture of the electrolyte and a metal powder of copper, nickel, cadmium, zinc, iron, manganese, lead, magnesium, titanium, silver, cobalt, indium, selenium and tellurium, as disclosed in copending application, Ser. No. 101,834 filed Dec. 28, 1970.

The electrolyte may consist of a highly conductive medium such as an aqueous solution of an acid, base or salt. In applications wherein conductivity of an electrolyte determines its selectivity, 30 percent sulfuric acid is especially preferred. Non-aqueous electrolytes can also be used. Solutes such as metal salts of organic and inorganic acids, ammonium and quaternary ammonium salts etc., may be incorporated in organic solvents as, for example, nitriles such as acetonitrile, propionitrile; sulfoxides such as dimethyl-, diethyl-, ethyl methyl-, and benzylmethyl sulfoxide; amides such as dimethyl formamide, pyrrolidones such as N-methylpyrrolidone; and carbonates such as propylene carbonate. Raymond Jasinski, "High Energy Batteries" and publications of the Proceedings of Nineteenth and Twentieth Annual Power Sources Conference disclose other candidate nonaqueous electrolytes.

Figure 2:
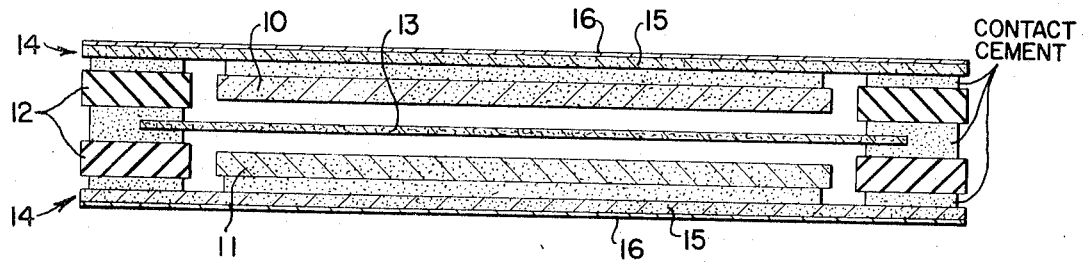
FIG. 2 is a cross section of the assembled capacitor.

A detailed description of the electrical capacitor having carbon paste electrodes is more fully disclosed in U.S. Pat. No. 3,536,963. In the assembly of the cell, the component parts are assembled in the order shown in FIGS. 1 and 2, and the same reference numerals are employed to designate the same component parts in both figures. The cell is then compressed at a pressure sufficient to render the cell a coherent structure. Pressures in the range of about 240 psi have been found sufficient for this purpose.

A stacked arrangement of single cell capacitors wherein the substrate of the electrically conducting, intercell connector is laminated on both sides with elastomer is also contemplated to be within the scope of this invention.

EXAMPLE I

An isobutylene isoprene rubber compound formulation was prepared by mixing the following components in the proportions indicated:

| | |
|---|---|
| Isobutylene-isoprene (% ratio, 98/2) polymer[1] | 100 parts by weight |
| Stearic acid | 2 parts by weight |
| Zinc oxide | 5 parts be weight |
| Paraffin | 2 parts by weight |
| Sulfur | 2 parts by weight |
| Extra Conductive furnace black[2] | 125 parts by weight |
| Mercaptobenzothiazole[3] | 0.75 parts by weight |
| Tetramethylthiuram disulfide[4] | 1.25 parts by weight |

1 Butyl 365 - Enjay Chemical Co.

2 Vulcan XC-72 - Cabot Corporation

3 Captax - R. T. Vanderbilt Co. Inc.

4 Methyl Tuads - R. T. Vanderbilt Co. Inc.

A sample of the above material after mixing was sheeted out to a thickness of 10 mils (0.010 inch) on a differential roll mill. This was then vulcanized onto a primed metal surface consisting of a nickel foil disc 1.125 inches in diameter and five mils thick. The primer comprised a 0.5 weight percent solution of polyethyleneimine[5] (5 PEI-18 - Dow Chemical Co.) dissolved in ethanol. This was painted onto the nickel foil and air dried for 30 minutes at 75° F., and then air oven dried for 30 minutes at 125° F. The primed surface was covered with the above 10 mil sheet of butyl rubber compound, placed between two chrome plated metal sheets in a hydraulic press maintained at a temperature of 320° F., and the press closed at a total force of 25,000 lbs. The assembly was vulcanized under pressure at 320° F. fro 20 minutes. After calendering and vulcanizing, the nickel foil was coated with a 3 mil thick layer of butyl rubber vulcanized to its surface. This rubber layer was highly conductive electrically.

Two butyl rubber-nickel foil connectors prepared as above were incorporated in a capacitor that was constructed and assembled as shown in FIG. 1. The capacitor contained a pair of carbon paste electrodes, 1.125 inches in diameter, prepared from activated carbon (Nuchar Activated Carbon C–115, obtained from West Virginia Pulp and Paper Company), having a surface area of 700–950 m$^2$/g; an electrolyte consisting of 30 percent aqueous sulfuric acid; an ionically conducting separator, 1.125 inches in diameter, and 3 mils thick, prepared from an anisotropic membrane consisting of two separate plastic layers of microporous plastic sheet of the same polymer composition, one layer consisting of a microporous sponge with a porosity of 50–80 percent, and the other a consolidated layer with a porosity of 1–3 percent, the membrane having a resistivity in 40 percent KOH of 3.8 ohm-cm; and a pair of gaskets constructed from a copolymer of vinylidene fluoride and hexafluoropropylene, (Viton) having a thickness of 0.015 inch, an I.D. of seven-eighths inches and an O.D. of 1.125 inches. The assembled cell was placed in a clamp and a 1.25 inch (I.D.) retaining ring slipped over the capacitor and cylinder assembly. The cell was compressed under a pressure of 240 psi. The equivalent series resistance of the capacitor was measured and found to be 28 milliohms.

EXAMPLE II

A capacitor was constructed as in Example I with the exception that the metal substrate of the connector consisted of copper sheet instead of nickel foil and the butyl rubber elastomer was vulcanized directly on the copper without the use of a primer. The equivalent series resistance of the capacitor after performing for 1,000 hours was 40 milliohms.

EXAMPLE III

A capacitor was constructed as in Example I with the exception that the metal substrate of the electron-conducting connector consisted of tin plate on steel. The equivalent series resistance of the capacitor was equivalent to 20 milliohms.

EXAMPLE IV

A capacitor was assembled as in Example I except that the electronically conducting connector comprised carbon-saturated butyl rubber containing 150 parts by weight of furnace black per 100 parts be weight of rubber laminated to a metal substrate of Hastelloy B (nickel, 24–32 percent molybdenum, 3–7 percent iron, 0.02–0.12 percent carbon) that was coated with a primer solution consisting of 1 weight percent of gamma-aminopropyltriethoxysilane in ethanol. The capacitor had a measured equivalent series resistance of 57 milliohms.

EXAMPLE V

A capacitor was constructed as in Example I with the exception that the elastomer laminate of the electron-conducting connector consisted of high density polyethylene containing 95 parts by weight of electrically conducting furnace black per 100 parts by weight of elastomer. The capacitor had an equivalent series resistance of 35 milliohms. Electron-conducting connectors prepared from copolymers of butadiene with styrene and with acrylonitrile gave similar results.

EXAMPLE VI

A capacitor was constructed as in Example I with the exception that the electron-conducting connector was constructed by silk screening onto a nickel foil substrate a fluid paste formed by dissolving a mixture of 30 grams of butyl rubber containing 125 parts by weight of electrically conductive furnace black per 100 parts by weight of rubber in 70 mls. of a 50–50 solvent mixture of toluene and xylene. The paste was applied onto the foil to a thickness of 2 mils. The connector thus constructed had a resistance of 22 milliohms.

I claim:

1. An electron-conducting connector including a substrate composed of a material selected from the group consisting of a metal and graphite, and an ion-insulating elastomer having electrically conductive carbon black blended therein for imparting electrical conductivity thereto, said elastomer and substrate adhering together and forming an electronically conductive ion-insulating, impervious laminate.

2. The connector of claim 1 wherein the elastomer is selected from the group consisting of butyl rubber, copolymers of butadiene-acrylonitrile, and butadiene-styrene, and the natural rubbers.

3. The connector of claim 2 wherein the elastomer consists of butyl rubber.

4. The connector of claim 1 wherein the elastomer is blended with from about 50 to 200 parts by weight of electrically conductive carbon black per 100 parts by weight of the elastomer.

5. The connector of claim 1 wherein the elastomer consists of butyl rubber blended with from 75 to 175 parts by weight of electrically conductive carbon black per 100 parts by weight of the butyl rubber, and the substrate consists of a metal selected from the group consisting of nickel and a nickel-containing alloy.

6. The connector of claim 5 wherein the butyl rubber-carbon black blend is laminated to a nickel substrate having been previously coated with a polyethyleneimine primer.

7. The connector of claim 6 wherein the butyl rubber-carbon black blend laminated to the nickel substrate is cured by vulcanizing.

8. An electrical capacitor comprising a pair of spaced active carbon electrodes compressed from a viscous paste of carbon particles and an electrolyte; a porous ionically conductive separator saturated with electrolyte between said electrodes; and an electron-conducting, ion-insulating connector impervious to the electrolyte positioned adjacent to the outside of each of said electrodes, said electron-conducting, ion-insulating connectors consisting essentially of an elastomer containing a sufficient amount of electrically conductive carbon black to impart electrical conductivity thereto, laminated to a substrate composed of a material selected from the group consisting of a metal and graphite, said elastomer being laminated to at least one side of the substrate immediately facing the electrode.

9. The electrical capacitor of claim 8 wherein the electrolyte consists of 30 percent sulfuric acid.

10. The electrical capacitor of claim 9 wherein the elastomer of the electron-conducting, ion-insulating connector consists of butyl rubber blended with from about 75 to 175 parts by weight of electrically conductive carbon black per 100 parts by weight of the butyl rubber, and the substrate consists of a metal selected from the group consisting of nickel and a nickel-containing alloy.

* * * * *